United States Patent
Tanielian (10) Patent No.: US 7,434,638 B2
(45) Date of Patent: Oct. 14, 2008

(54) ROBOTIC ALL TERRAIN SURVEYOR

(75) Inventor: Minas Tanielian, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 23 days.

(21) Appl. No.: 11/538,182

(22) Filed: Oct. 3, 2006

(65) Prior Publication Data

US 2007/0144798 A1   Jun. 28, 2007

Related U.S. Application Data

(62) Division of application No. 10/981,912, filed on Nov. 4, 2004, now Pat. No. 7,165,637.

(51) Int. Cl.
   *B62D 51/06*   (2006.01)
(52) U.S. Cl. ............................ 180/7.1; 901/1
(58) Field of Classification Search ............... 180/8.1, 180/8.5, 8.6, 7.1
   See application file for complete search history.

(56) References Cited

U.S. PATENT DOCUMENTS

| 3,734,220 | A | * | 5/1973 | Smith ..................... 180/8.6 |
| 5,351,773 | A | * | 10/1994 | Yanagisawa ............ 180/8.5 |
| 5,361,186 | A | * | 11/1994 | Tanie et al. .............. 361/191 |
| 5,964,639 | A |   | 10/1999 | Maxim et al. |
| 6,247,546 | B1 |   | 6/2001 | Spletzer et al. |
| 6,286,386 | B1 |   | 9/2001 | Spletzer et al. |
| 6,491,119 | B1 |   | 12/2002 | Neu |
| 2003/0190998 | A1 |   | 10/2003 | Hackworth et al. |

FOREIGN PATENT DOCUMENTS

| DE | 2606399 | 8/1977 |
| JP | 62255298 | 11/1987 |
| WO | WO 01/49373 | 7/2001 |

OTHER PUBLICATIONS

D. D Koditschek and M. Buhler; Citations: Analysis of a Simplified Hopping Robot—Koditschek, Buehler; Citeseer, http://citeseer.ist.psu.edu/context/630910/0; viewed Aug. 4, 2004, 7 pages.

(Continued)

*Primary Examiner*—Kevin Hurley
(74) *Attorney, Agent, or Firm*—Harness, Dickey & Pierce, P.L.C.

(57) ABSTRACT

A vehicle including a body and three legs. Each leg includes a proximal end coupled to the body, a distal end opposite the proximal end, and an actuator. Each actuator imparts enough acceleration to the vehicle along an axis of the leg to cause the distal end of the leg to leave a surface upon which it rests. Thus, the robot can pivot around one leg when the actuator of another leg imparts an acceleration. One actuator may also cause two legs to leave the surface. Moreover, the actuators may be spring biased into a retracted position. Further, the body may be a Platonic solid and the axes of the lags may pass through the vehicle's center of gravity. Of course, the body could be a sphere while the vehicle could be a planetary robot or a toy. Methods of traversing a surface are also provided.

19 Claims, 9 Drawing Sheets

OTHER PUBLICATIONS

Fiorini, Paolo; Innovative Mobility Systems: Hopping Robots, http://robotics.jpl.nasa.gov/people/fiorini/hopbot/homepage.html/viewed Aug. 4, 2004, 3 pages.

Chandana, Paul; Fumiya, Iida; Raja, Dravid, Control of Lateral Bounding for a Pendulum Driven Hopping Robot, undated paper; Articial Intelligence Lab, University of Zurich, Switzerland.

Fiorini, Hayati; Heverly, Gensler, A Hopping Robot for Planetary Exploration, undated paper; Jet Propulsion Laboratory, California Institute of Technology, Pasadena, CA 91109.

Biologically-Inspired Fast Running Robots; www.mechantronics.mech.tohoku.ac.jp/research/Kenken/kenken_en.htm; viewed Aug. 4, 2004, 6 pages.

Sandia National Laboratories, Sandia Hoppers Leapfrog Conventional Wisdom About Robot Mobility; News Release, viewed Aug. 4, 2004; www.sandia.gov/media/NewsRel/NR2000/hoppers.htm, 4 pages.

Stable One-Legged Hopping Robot With A Circular Foot; www.iwr.uni-heidelberg.de/~agbock/people/katja/hopper1.html, viewed Aug. 4, 2004, 2 pages.

American Society For Engineering Education, Robots that Keep Going and Going; Connections, Oct. 2003 issue, 9 pages.

http://mathworld.wolfram.com/PlatonicSolid.html, dated Aug. 12, 2004, 7 pages.

International Search Report for PCT/US2005/039861, dated Jun. 6, 2006.

UK Intellectual Property Office Search Report for Application GB0708373.6, dated Oct. 29, 2007.

* cited by examiner

ROBOTIC ALL TERRAIN SURVEYOR

CROSS-REFERENCE TO RELATED APPLICATIONS

This application is a divisional of U.S. patent application Ser. No. 10/981,912 filed on Nov. 4, 2004, now U.S. Pat. No. 7,165,637. The disclosure of the above application is incorporated herein by reference.

FIELD

This invention relates generally to all-terrain vehicles and, more particularly, to all terrain vehicles for traversing surfaces that are likely to include obstructions.

BACKGROUND

Many tasks expose human workers to adverse, or hostile, environmental conditions. Fighting fires, repairing underwater structures, reconnoitering an area, exploring planets, rescuing hostages and stranded people, and attacking enemy positions expose the personnel involved to a variety of risks to life and limb. For some time now robots have been employed to accomplish portions of these tasks. Some robots are simply equipped with wheels or tracks and can only operate on flat, unobstructed surfaces. Even the presence of small obstacles, ledges, steps, ravines and the like disable these simple devises. More complex wheeled robots, like the Mars rovers of recent years, have their wheels mounted on arms that allow the wheels some freedom to move vertically. Yet these robots may still become hung up on larger obstacles. Biologically inspired bipedal robots have also been introduced in an effort to overcome obstacles. These bipedal robots include complex leg mechanisms that mimic the walking motion of a human being. The software required to operate these mechanisms is quite complex and can do nothing to save the robot should it be toppled.

Also, because many robots use air-breathing engines for power they cannot be used in space or underwater. The use of environmental air for combustion also poses problems if the robot should enter an environment contaminated by airborne chemicals (e.g. pollution, poisoning, smoke, etc.) Many of these substances can clog air filters or attack the hot interior surfaces of the engine and thereby precipitate failure of the engine. Further, many currently available robots use their onboard power supplies inefficiently thereby precluding long missions. The inefficiency is in part due to the need for the robot to run the engine even while loitering to have power available in case a disturbance attempts to topple the robot.

Despite the problems with currently available robots, the need for robots has often been cited by many private and public organizations. Therefore a need exists for efficient robots capable of navigating around obstacles and escaping from traps.

SUMMARY

It is in view of the above problems that the present invention was developed. The invention provides apparatus and methods for traversing surfaces, particularly rough surfaces such as those encountered during planetary exploration, reconnaissance, or rescue missions.

A first preferred embodiment of the present invention provides a small tactical robot. The robot has a spherical body and a plurality of legs extending about the periphery of the body in a manner similar to that of the spines of a sea urchin. For energy, a tank onboard the robot contains an energy rich fuel (e.g. hydrogen peroxide) that is converted to hot gas by a catalyst bed to drive the robot. By decomposing the fuel, as opposed to combusting the fuel, the need for combustion air drawn from the environment is eliminated. The hot gas drives two-stroke actuators positioned in each of the legs of the robot that, preferably, work in a manner similar to a gas driven pogo-stick. When the hot gas enters the actuator, the gas attempts to drive a piston of the actuator out and away from the body. In turn, the piston pushes against the surface upon which it (and the robot) rests and accelerates the robot away from the surface. If the acceleration is great enough, the robot becomes airborne (i.e. the robot leaves the surface). Because the actuated leg is usually not perpendicular to the surface, the robot will traverse some distance across the surface while in the air. Thus, the robot moves by hopping around on its legs and can therefore overcome obstacles and escape from traps.

In a second preferred embodiment, the present invention provides a vehicle that includes a body and three or more legs. Each leg includes a proximal end coupled to the body, a distal end opposite the proximal end, and an actuator. Each actuator imparts enough acceleration to the vehicle along a longitudinal axis of the leg to cause the distal end of the leg to leave the surface upon which it rests. Thus, the robot can pivot around one leg when the actuator of another leg imparts an acceleration. One actuator may also cause two legs to leave the surface. Moreover, the actuators may be spring biased into a retracted position. Further, the location of the robot's legs may be based on a Platonic solid (e.g. a tetrahedron, hexahedron or cube, octahedron, dodecahedron, or icosahedron) and the axes of the legs may pass through the vehicle's center of gravity. Of course, the body could be a sphere while the vehicle's itself could be a planetary exploration robot or a toy.

In a third preferred embodiment, the present invention provides a method of traversing a surface. Generally, the method includes determining which legs of a multi-legged vehicle are resting on a surface, determining in which direction to proceed, and imparting an acceleration to the vehicle using one of the legs. The imparted acceleration causes at least one leg to leave the surface upon which the leg rests. Thus, obstacles on the surface maybe hopped over. Alternatively, the vehicle can pivot around a leg other than the one imparting the acceleration.

In another preferred embodiment, the present invention provides a robot that includes a body having the shape of a dodecahedron and 12 legs corresponding to each of the 12 faces of the dodecahedron. Each leg includes a proximal end coupled to the body at the center of one of the faces. Further, each leg is perpendicular to the face to which it is coupled and includes an actuator. Also, the robot includes a control mechanism or circuit that causes at least one of the actuators to impart an acceleration to the robot.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Referring to the accompanying drawings in which like reference numbers indicate like elements, FIGS. 1A to 1E show several embodiments of robots constructed in accordance with the principles of the present invention.

Figure 1A:
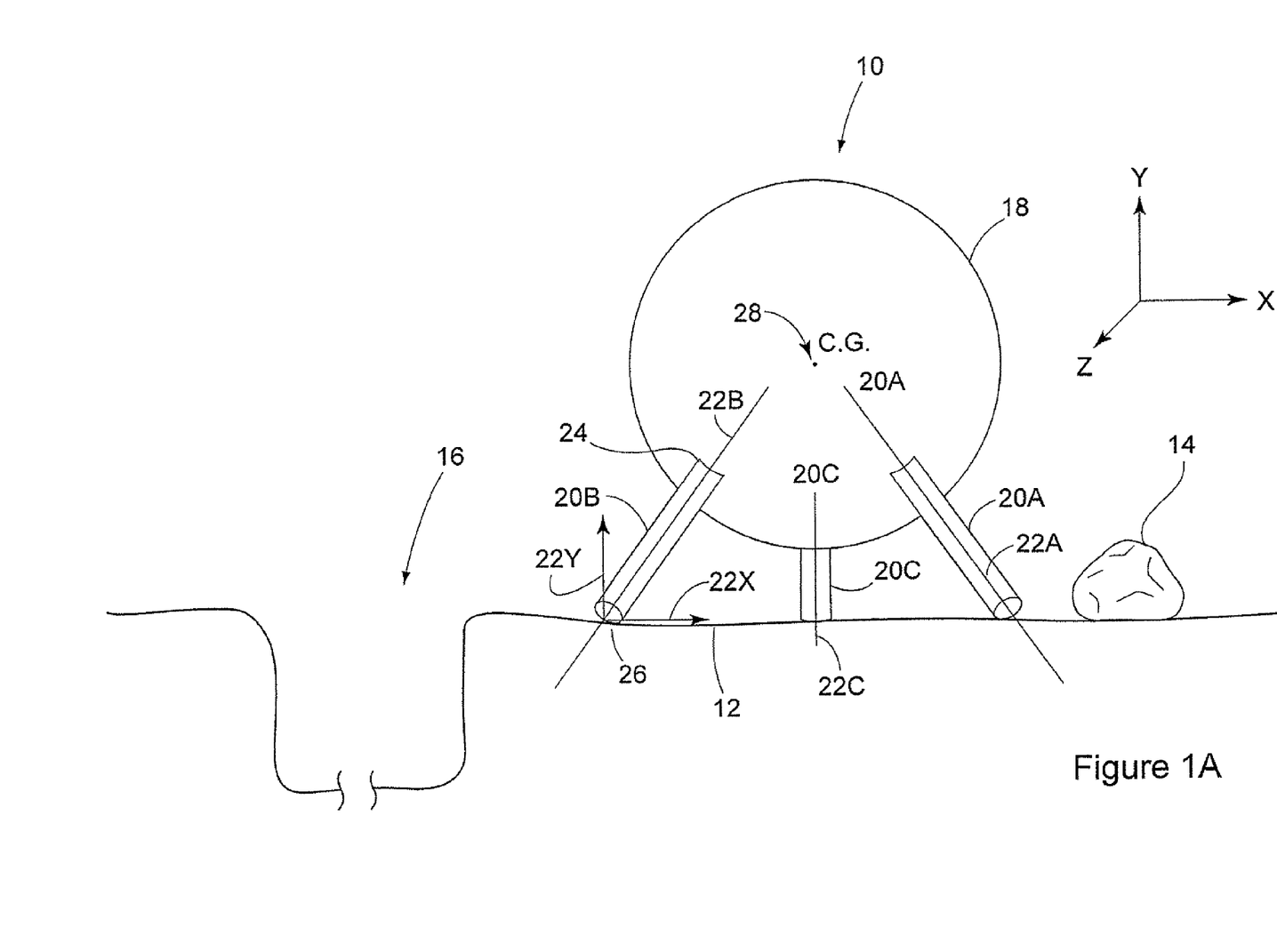
FIGS. 1A to 1E show several embodiments of robots constructed in accordance with the principles of the present invention.

FIG. 1A shows the robot 10 resting on a surface 12. The surface 12 could be any surface such as terrain on the Earth, the Moon, Mars, or other celestial bodies. In the alternative, the surface 12 could also be a floor of a room, or a deck of a ship or aircraft. Thus, the nature of the surface 12 does not restrict the scope of the invention. Typically, the surface 12 includes obstacles such as large rocks 14 or chasms 16 that would likely cause conventional robots to become trapped by, or stuck on, the obstacles 14 or 16. As will be described, the robot 10 is able to hop over these obstacles 14 and 16 and otherwise traverse the surface 12.

Figure 1B:
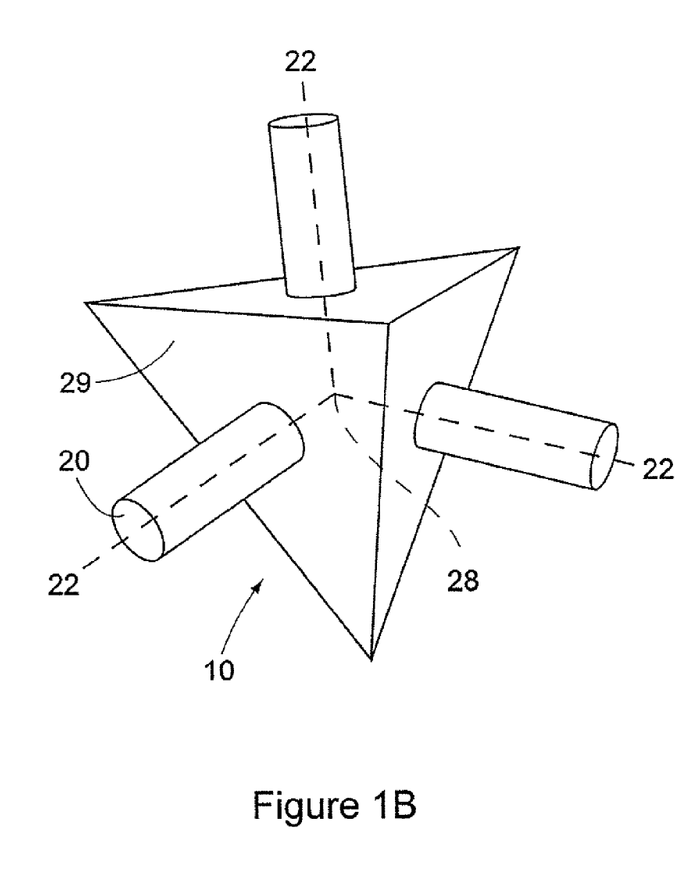
Figure 1C:
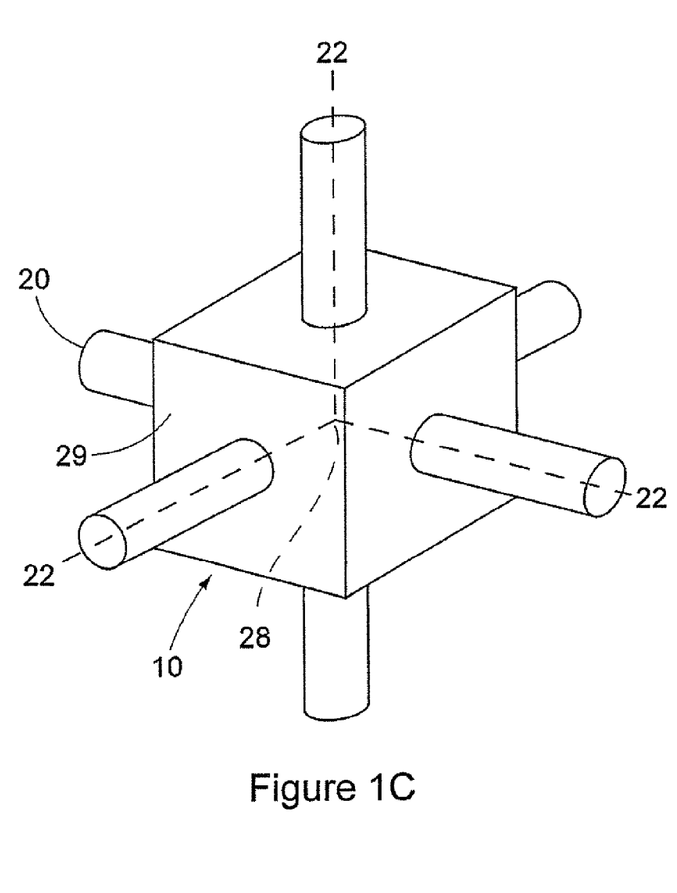
Figure 1D:
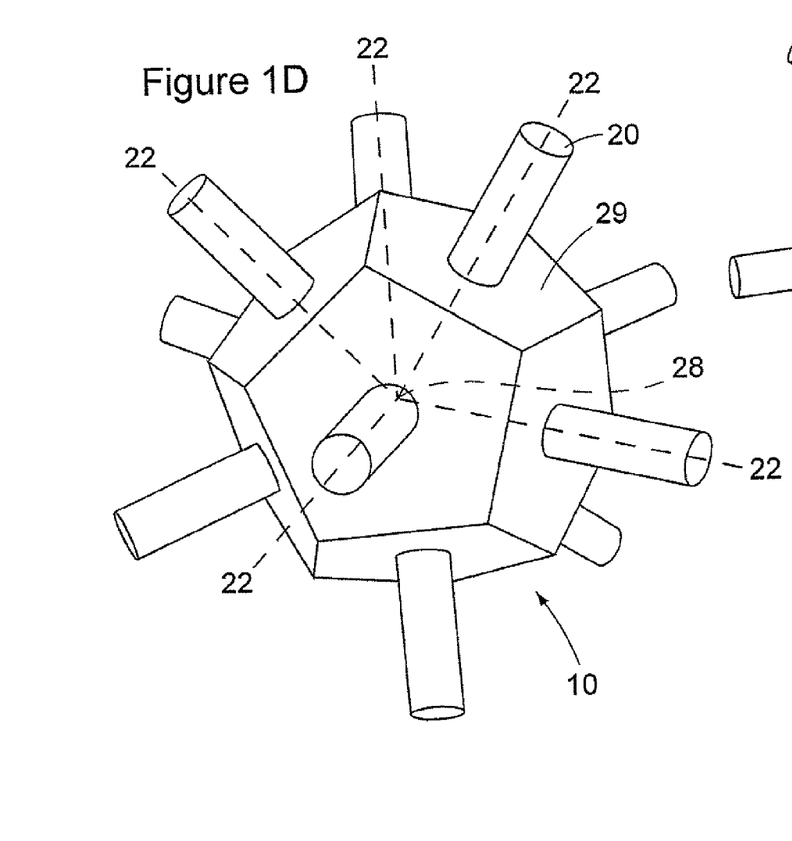
Figure 1E:
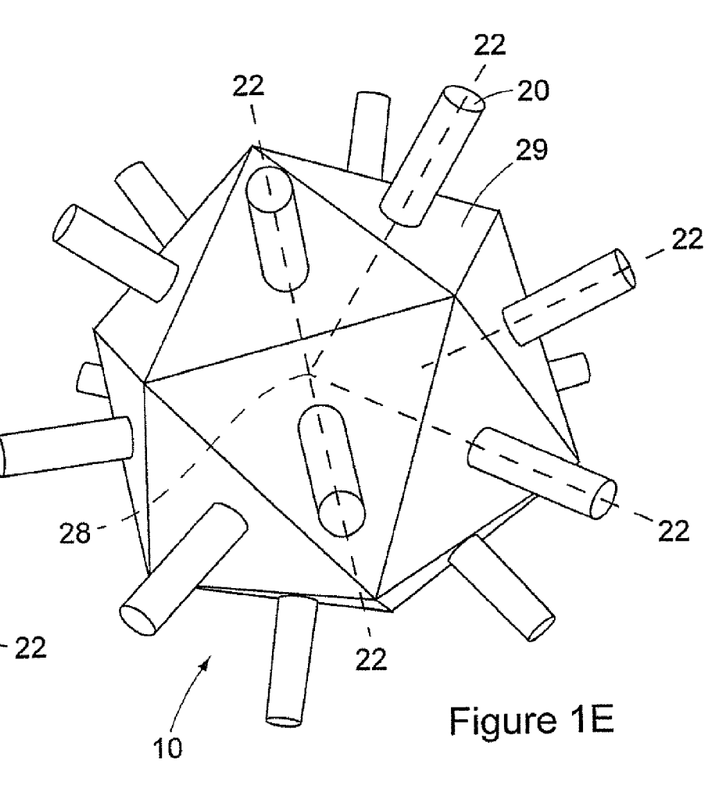

With continuing reference to FIG. 1A, the robot 10 includes a body 18 and a plurality of legs 20. In the current embodiment, the robot 10 has 3 legs 20A, 2013, and 20C. Each leg 20 defines a longitudinal axis 22 that runs between the proximal end 24 and the distal end 26 of the leg 20. The robot 10 also includes a center of gravity 28 that may be coincident with the center of gravity of the body 18. In general, the legs 20 are distributed about the periphery of the body 18. More particularly, the three legs 20A, 2013, and 20C of the present embodiment are shown spaced about the lower half of the body 18. Each leg 20 is preferably rigidly coupled to the body 18 at the proximal end 24 in such a manner that the longitudinal axis 22 extends through the center of gravity 28 of the robot. Though, other embodiments provide robots 10 in which the longitudinal axis may extend above (or below) the center of gravity 28. Further, additionally legs 20 can be included on the robot 10. For example, one preferred embodiment as shown in FIG. 1B includes four legs. The body shown in FIG. 1B comprises a tetrahedron with four faces 29. A longitudinal axis 22 of each leg 20 extends through the center of gravity 28 of the body 10, with each leg 20 being coupled to a respective face 29. FIG. 1C shows an alternate embodiment where the body 10 comprises a hexahedron with six legs coupled to the body at each face of the body. FIG. 1D shows an alternate embodiment where the body comprises a dodecahedron with twelve legs extending from each of the faces of the body. FIG. 1E shows another alternate embodiment of the body (comprising an icosahedron comprising twenty faces and twenty legs with each of the twenty legs being coupled to the body and extending from a respective face.

In operation, each leg 20 is able to impart an acceleration to the robot 10 along the longitudinal axis 22. More particularly, the acceleration provided by the leg 20 is sufficient to propel the distal end 26 of the leg 20 away from the surface 12 and preferably sufficient to propel the entire robot 10 away from the surface 12 in the direction of the longitudinal axis 22. Thus, when it is desired for the robot 10 to move, one leg 20 accelerates the robot away from the surface 12 in the direction of the y-component 22Y of the longitudinal axis 22 and along the surface 12 in the direction of the x-component 22X of the longitudinal axis 22. While, the components 22X and 22Y of the longitudinal axis are shown as being horizontal and vertical, respectively, no such limitation is implied regarding the scope of the present invention. Rather, the components 22X and 22Y merely designate a direction generally parallel and generally perpendicular to the surface 12, respectively, at the point where the leg 20 rests on the surface 12.

If it is desired for the robot 10 to traverse the surface 12 beyond the position of the obstacle 14, the leg furthest from the rock 14 (here leg 20B) is used to propel the robot 10 along the longitudinal axis 22B. Upon leaving the surface 12, the robot 10 hops over the rock 14 along a generally ballistic path. Further, as shown by FIG. 1A, at times the orientation of the robot 10 will be such that no one leg 20A, 20B, or 20C is directly opposite the chasm 16. In these situations the legs 20A and 20C that are most directly opposite the chasm 16 (relative to the center of gravity 28) operate in combination to propel the robot 10 over the chasm 16. Those skilled in the art will recognize that the force imparted by each of the legs 20A and 20C will have x and y components as well as a z component directed into, or out of, the page. By choosing which legs 20 are to propel the robot 10, and choosing the amount of force to be applied by each leg 20, it is possible to direct the robot 10 in any direction in the x-z plane. In a similar manner it is also possible to determine how far above the surface 12 the robot 10 is propelled. Thus, the trajectory of the robot 10 can be tailored to the specific needs of a particular mission or specific maneuver. The ability to tailor the trajectory is particularly useful in crowded environments or where the robot 10 must jump through an aperture in a structure (e.g. a window). If the vertical portion of the trajectory were left uncontrolled, the robot might be able to fling itself at the window, but there would be no assurance that the robot 10 would pass through the opening. Rather, it could strike above or below the opening.

Figures 2A, 2B:
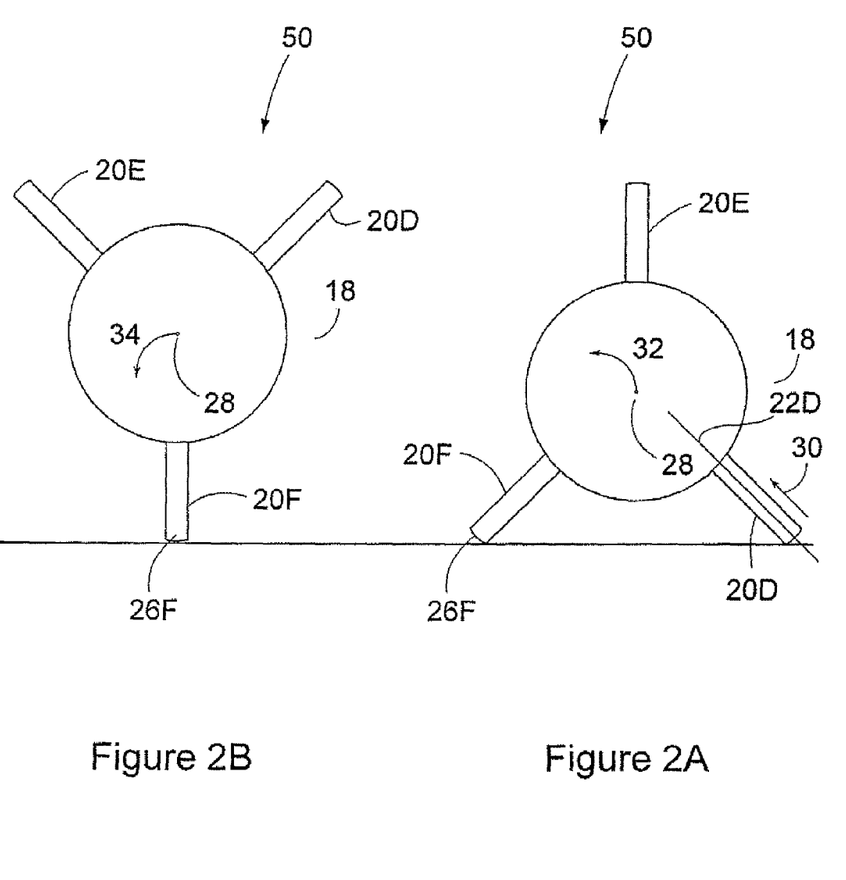
FIGS. 2A to 2C illustrate side elevation views of a robot constructed in accordance with a preferred embodiment of the present invention as the robot traverses a surface.
Figure 2C:
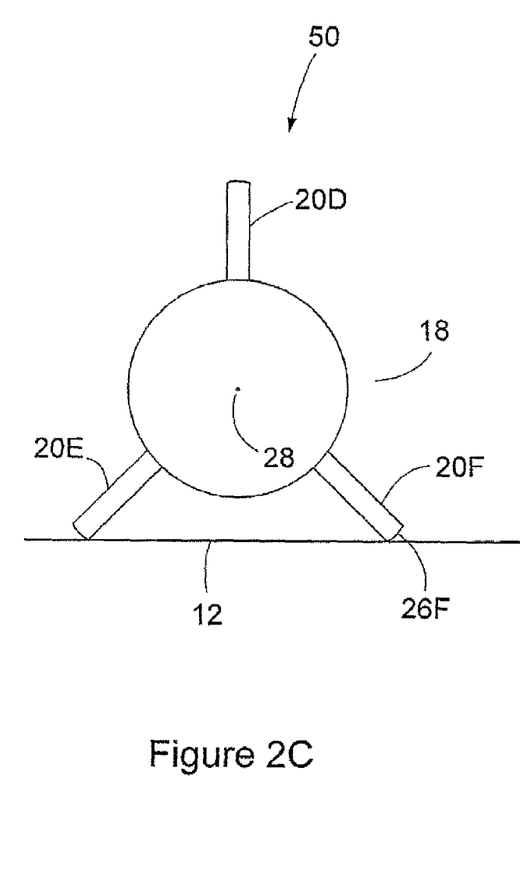

Other modes of locomotion are also possible for the robot 50 as illustrated by FIGS. 2 and 3. For instance, a set of legs 20D, 20E, and 20F (FIG. 2) can be attached to the body 18 in such a manner that the robot 50 pivots about the distal end 26 of one of the legs 20 when another of the legs propels the robot 50. More particularly, the legs 20D, 20E, and 20F could be distributed about the body 18 in such a manner that they all lie in a plane that is generally perpendicular to the surface 12 and extending through the center of gravity 28. In the current embodiment, the robot 50 rests on a pair of legs 20D and 20F, for example, and may be wide enough that the robot 50 is stable and cannot topple into, or out of, the page as seen in FIG. 2.

When it is desired for the robot 50 to move, one of the legs is actuated so that it imparts an acceleration to the robot 50. Arrow 30 in FIG. 2A shows leg 20D propelling the robot 50 along the longitudinal axis 22D. The imparted acceleration is enough to lift leg 20D from the surface 12, but not necessarily enough to propel the robot 50 (i.e. the leg 20F) from the surface 12. The resulting moment acting about the distal end 26F of leg 20F causes the robot 50 to pivot or rotate about the distal end 26F as shown by the arrow 32. In FIG. 2B, the continued rotation of the robot 50 about the distal end 26F is indicated by arrow 34 as the leg 20D approaches a position generally above the body 18. Then, in FIG. 2C the rotation can stop as leg 20E pivots into contact with the surface 12. Thus, the leg 20D has caused the robot 50 to pivot about the distal end 26F of another leg 20F to traverse the surface 12. That is, the robot 50 rolls up and over leg 26F because leg 20D imparted an acceleration to the robot 50.

It is preferred for the robot 50 to continue rolling leg-over-leg to traverse the surface 12, but the robot 50 can be configured to stop after each incremental rotation and re-assess its position. The continuous leg-over-leg rolling can be affected by timing a series of leg 20 actuations (e.g. legs 20D, 20E, 20F and so forth) to occur as each incremental rotation comes to a finish. In this manner, the momentum of the robot 50 is preserved thereby lowering the amount of fuel required to traverse the surface. As illustrated in FIG. 2, the robot 50 is therefore able to roll leg-over-leg along the surface 12 as well as hopping about the surface 12.

Figure 3A:
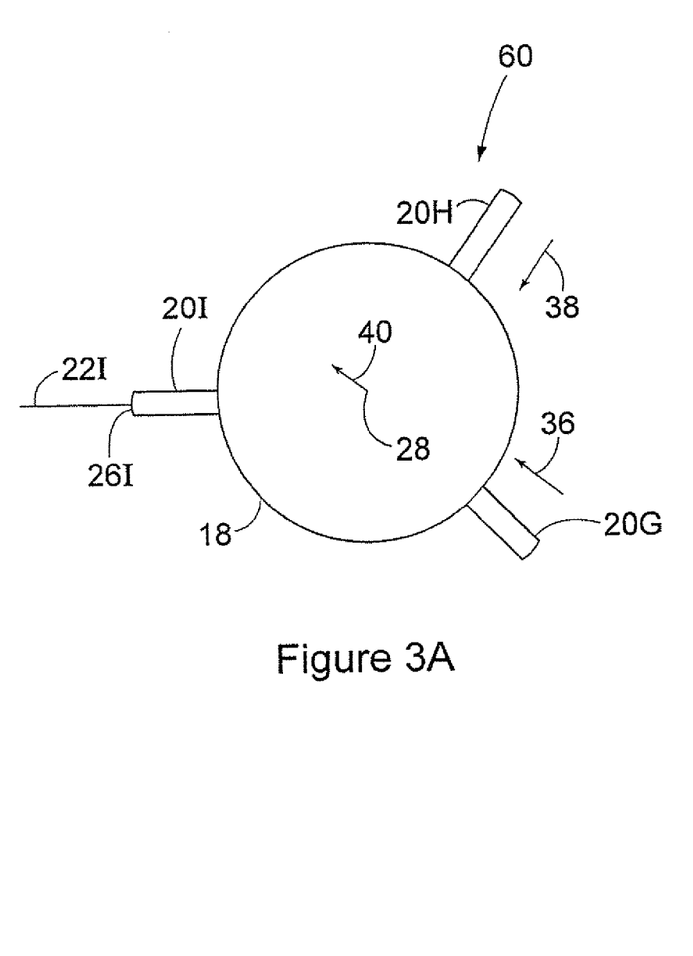
FIG. 3A to 3B illustrate top plan views of a robot of another preferred embodiment as the robot traverses the surface.
Figure 3B:
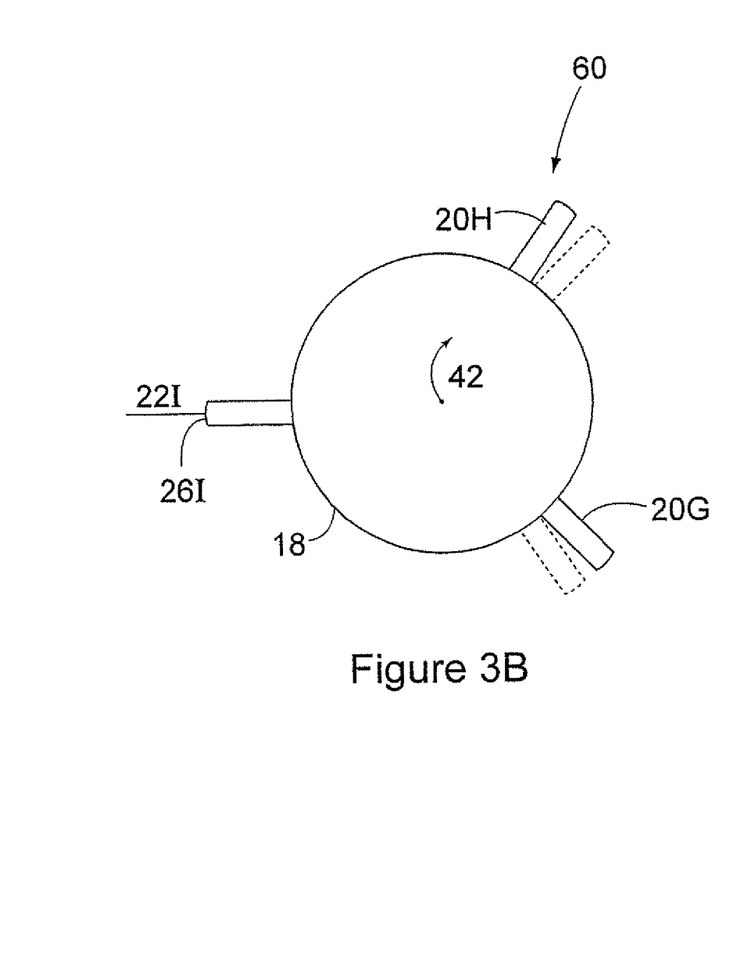

FIG. 3 illustrates another mode of locomotion of the robot 60. FIG. 3A shows the robot 60 viewed directly from above with legs 20G, 20H, and 20I extending from the lower half of the body 18. Legs 20G and 20H are each shown (via arrows 36 and 38 respectively) imparting acceleration to the robot 60. The accelerations 36 and 38 combine to produce a net acceleration 40 acting up and through the center of gravity 28 of the robot 60. The net acceleration 40 causes both legs 20G and 20H to rise from the surface 12 with the remaining leg 20I remaining in contact with the surface 12. Because the net acceleration 40 is directed at an acute angle with respect to the leg 20I, the robot 60 responds by pivoting about the distal end 26I of the leg 20I as shown by the arrow 42 (see FIG. 3B). As a result, the robot 60 takes a small "step" toward the side of the body 18 generally in the direction of the force 40. The operation can then be repeated with a different pair of legs 20 to cause the robot 60 to step in another direction. By repetition of this operation, the robot 60 can be made to appear to walk (or colloquially to "waddle" from side to side) in any direction. Such actions are particularly useful for re-orientating the robot 60 and for making incremental adjustments to the location of the robot 60.

Figure 4:
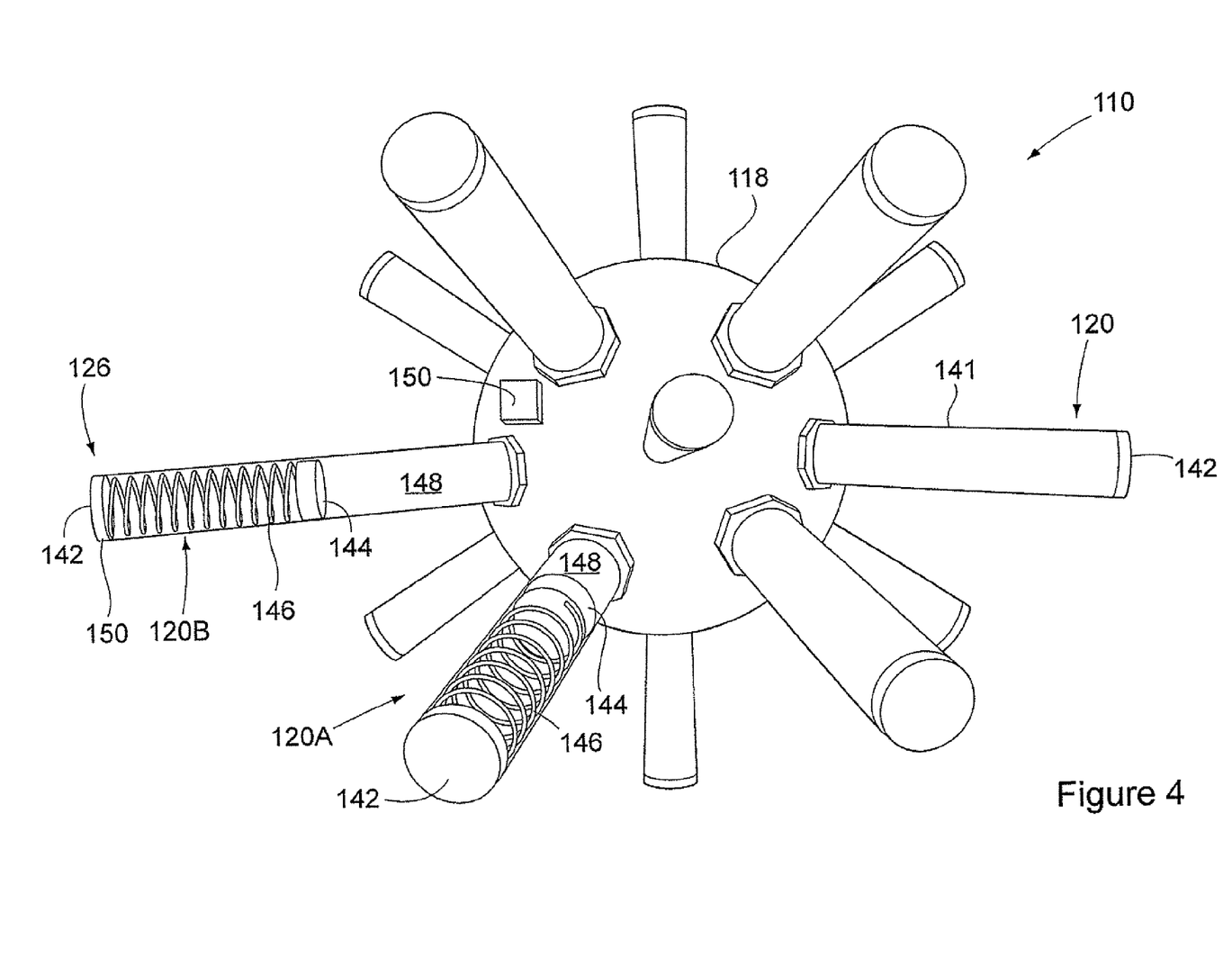
FIG. 4 illustrates another robot constructed in accordance with a preferred embodiment of the present invention.

Turning now to FIG. 4, another preferred embodiment of the present invention is shown. The robot 110 includes a plurality of legs 120 distributed about its periphery. More particularly, a pair of the legs 120A and 120B are shown with a cover 141 of the legs 120 removed so that the internal components of the legs 120A and 120B are shown. The internal components of the legs 120 include an actuator "foot" 142 and an actuator piston 144 coupled by a spring 146. Also shown inside the leg is a cylinder or gas expansion chamber 148. The foot 142 is adapted to rest on, and exert a force against, a surface (not shown). Generally, the foot 142 will rest on the surface at an acute angle so that one side 150 of the leg 120, or another side of the leg 120, will contact the surface. The side 150 may be roughened or otherwise treated to improve traction with the surface so that when the leg 120 is actuated little, or no, slipping of the leg 120 occurs. The piston 144 fits in, and slides along, the cylinder 148. Additional, a seal may be placed around the piston 144 to prevent gas from leaking out of the cylinder 148 prematurely during operation.

In operation, fuel from a tank (to be discussed with reference to FIG. 6) is rapidly converted to a hot gas. The pressurized gas drives the piston 144 out toward the distal end 126 of the cylinder 148 and leg 120. As the piston 144 accelerates, it compresses the spring 146 thereby causing the spring 146 to exert a force on the foot 142. As the piston 144 moves past a location along the cylinder 148, it exposes a vent hole (or holes) on the side of the cylinder 148 through which the hot gases generated in the proximal end of the leg 126 are released. The uncovering of the vent holes restores the atmospheric pressure (or vacuum if operating in space) inside the leg 126, which allows the foot 142, in turn, to push against the surface thereby causing an opposite reaction on the robot 110 and to simultaneously release the spring tension. Thus, depending on the gas pressure and flow rate, the actuator accelerates the robot 110 sufficiently to lift the leg 120 from the surface. More particularly, the acceleration (optionally combined with the acceleration provided by other legs 120) can be enough to cause the entire robot 110 to leave the surface. Thus, the robot 110 of FIG. 4 can also hop. As the robot 110 lands after a hop, it will roll to a stop where it will generally rest on a set of legs 120 different than the set of legs 120 upon which it rested before the hop. Because the plurality of legs 120 allows the robot to roll the software controlling the robot 110 need not be complicated by routines necessary to predict the robot's 10 orientation after a move or necessary to maintain the robot 110 in a stable (or meta-stable) orientation. Rather, a preferred control system need only determine the current orientation with sufficient accuracy to select the legs 120 that will cause motion in the next desired direction. Moreover, if the robot 110 overshoots, or undershoots, its targeted location, the control system need only command another hop to bring the robot 110 to the target location. Accordingly, robots 110 constructed in accordance with the present invention are far simpler to build, program, and operate than those constructed in accordance with previous approaches to robot locomotion.

Furthermore, if the robot 110 becomes trapped, or stuck, a random series of hops may be sufficient to free the robot 110. Also, because the robot 110 will appear to move in an unpredictable fashion (jumping first one way, then another), it will be quite difficult for hostile forces to capture or disable the robot 110. Further, the apparently chaotic path followed by the robot 110 (with successive hops in rapid succession) may be sufficient to disorient or distract hostile forces in enclosed volumes (e.g. rooms). In fact, an operator of a robot 110 that has an onboard camera could purposely target a member of a hostile force with the robot 110 itself.

The spherical body 118 of the robot 110 illustrated in FIG. 4 also provides several other practical advantages. First, the sphere 118 allows ample stowage room for electronics, fuel supplies, and other systems and components that are best positioned onboard the robot 110. Further, the spherical body 118 can be configured to split open into two halves so that access can be had to the interior volume for changing batteries and refilling the fuel tank, for example.

Figures 5A, 5B:
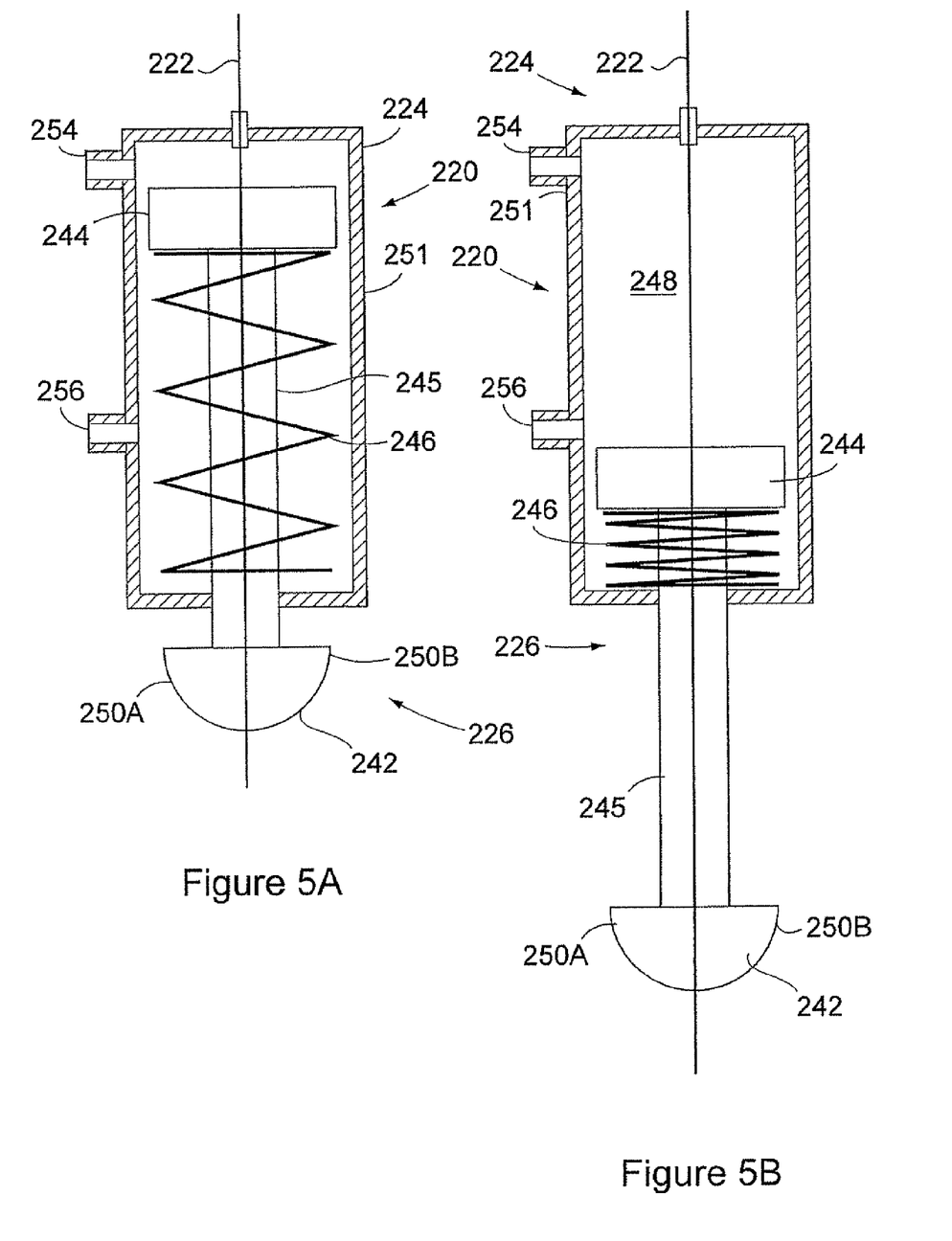
FIGS. 5A and 5B illustrates a leg of a robot constructed in accordance with another preferred embodiment of the present invention.

Turning now to FIGS. 5A and 5B, a leg 220 of a preferred embodiment of the present invention is illustrated in simplified cross section. FIG. 5A shows the leg 220 in a retracted position and FIG. 5B shows the leg 220 in an extended state. In the current embodiment, the robot is made to hop by rapidly driving the leg 220 from the retracted state of FIG. 5A to the extended state shown in FIG. 5B. While the leg is off of the surface, the leg retracts to the retracted position of FIG. 5A, thereby readying the leg 220 (and the robot) for the impending landing and for the next hop (should that leg 220 be needed for the next hop). The leg 220 includes a body 251, a foot 242, a piston 244, a connecting rod 245, a spring 246, an expansion chamber 248, a hot gas inlet port 254, and an exhaust outlet port 256.

Preferably the foot 242 is semispherical so that no matter what the orientation of the leg 220 relative to the surface may happen to be, the foot 242 can engage the surface and exert a force against it to propel the robot. The connecting rod 245 couples the foot 242 and the piston 244. The piston 244 slides within the expansion chamber 248 between the proximal 224 and distal 226 ends of the leg 220. Of course, the inner walls of the body 251 and the piston 244 define the expansion chamber 248. The spring is attached to the inner wall of the body 251 at the distal end 226 of the body and is also attached to the piston 244. Because the spring is pre-loaded in its extended form, the spring 246 biases the leg (i.e. the piston 244, connecting rod 245, and foot 242 assembly) in the retracted position, at atmospheric (i.e. ambient) pressure. The gas ports 254 and 256 are located, respectively at the proximal end of the expansion chamber 248 and near the distal end of the expansion chamber 248. Further, the exhaust port 256 is spaced apart from the distal end of the expansion chamber 248 by a distance at least equal to the compressed length of the spring 246 and the height of the piston 244.

In operation, hot pressurized gas is ported to the inlet 254 whereupon it enters the expansion chamber 248 and begins building pressure in the expansion chamber 248. Since the foot 242 is constrained by the surface (or eventually contacts the surface and becomes constrained if, initially, the leg 220 was over a hole or depression in the surface) the pressure of the hot gas acts against the proximal end of the expansion chamber 248 thereby causing the body 251 and the robot to accelerate along the longitudinal axis 222 in the proximal direction. The resulting relative movement between the body 251 and the piston 244 compresses the spring 246. Shortly before the exhaust port 256 is uncovered, the gas supply to the intake port 254 is isolated. The body 251 then moves far enough relative to the piston 244 so that the piston 244 uncovers the exhaust port 256 and allows the expanded gas to escape through the exhaust port 256. At about this time, the leg 220 reaches the extended position of FIG. 5B. With the gas escaping, the pressure in the chamber 248 rapidly begins to decrease thereby allowing the spring 246 to expand against the piston 244. As a result, the leg 220 begins to retract. It has been found in operation that the gas dynamics within the expansion chamber 248 and the spring dynamics can be matched so as to optimize the performance and efficiency of the leg 220. Further, the spring 244 can be tuned to provide damping as the piston reaches the distal end of the expansion chamber 248.

Figure 6:
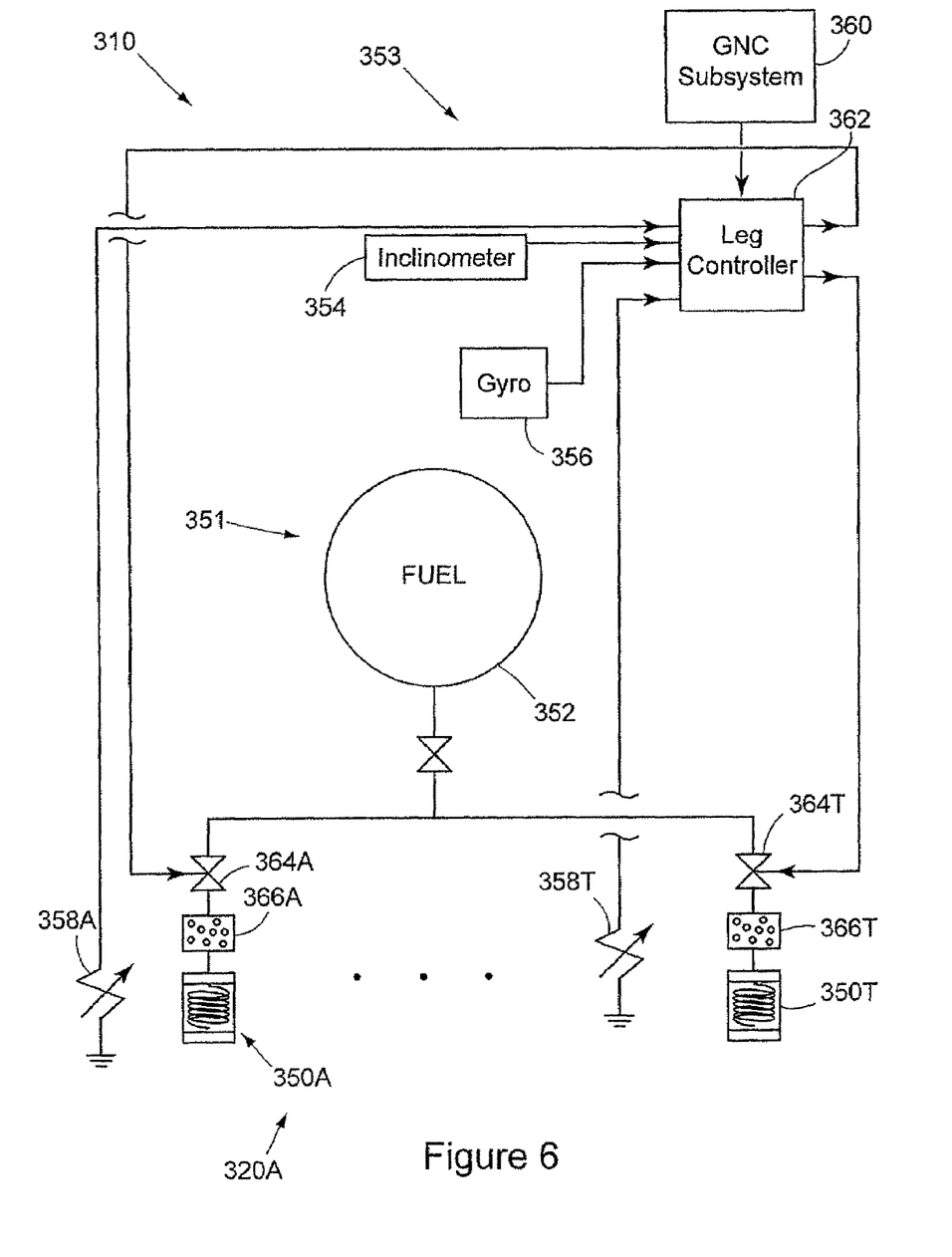
FIG. 6 illustrates a block diagram of an architecture of a robot constructed in accordance with another preferred embodiment of the present invention.

Turning now to FIG. 6, FIG. 6 illustrates a schematic of a fuel subsystem 353 and leg control subsystem 353 of the robot illustrated in FIG. 4. Generally, the fuel subsystem 351 feeds an actuator 350 for each of the legs 320A to 320T and includes a fuel tank 352, a control valve 364 for each of the actuators 350, and a catalytic gas generator 366 for each actuator 350. In the alternative, the robot 310 can include a common gas generator that feeds hot gas to each of the actuators 350 through the individual control valves 364. The leg control subsystem includes an inclinometer 354 (or alternatively a gyroscope 356 or infrared proximity sensors or weight sensors 358 on the legs 320) or other equivalents for determining which of the legs 320 are resting on the surface. The control subsystem also includes, or is in communication with, a guidance, navigation, and control (GN&C) subsystem 360 that among other things may determine which direction to move the robot 310. A leg controller 362 is also shown.

The inclinometer 354 allows the controller to determine which legs are resting on the surface based on knowledge of the configuration of the robot 310. In the alternative, the weight sensors 358 can allow the controller 362 to make a direct determination of which legs are contacting the surface. The controller 362 also communicates with the control valves 364. The control valves, of course, provide the capability to flow fuel from the fuel tank 352 to the gas generators 366 wherein the fuel decomposes exothermically to form a hot gas. The hot gas then flows into the actuator 350 for imparting an acceleration to the robot 310. By controlling how far the valve opens it is possible to select the amount of acceleration provided by each of the actuators 320A.

In operation, the robot 320 of the current embodiment functions as follows. The controller 362 receives a command from the GN&C subsystems to move the robot 310. From the inclinometer 354 data, the controller 362 determines which of the legs are resting on the surface and may thus participate in the move. Given the desired direction, distance, and height of the hop, the controller 362 selects the leg(s) 320 capable of moving the robot 310 to the desired position. Of course, the movement can be by way of a combination of "hops, "steps," or "pivots" as previously described. In accordance with the mode of locomotion selected and the orientation of the selected legs 320, the controller 362 calculates a combination of accelerations that will propel the robot to the target position. The controller 362 then opens each affected valve 364 by an amount that will cause the associated leg 320 to produce the desired acceleration for the particular leg. Fuel then flows from the tank 352 to the appropriate gas generators 366 where it decomposes and flows into the actuators 350 as a pressurized gas. In the actuators 350, the resulting hot gas causes the actuator 350 to impart the desired acceleration to the robot 310. Since the selected actuators 350 operate at approximately the same time, the net result of the accelerations from each of the legs 320 is an overall acceleration for the robot 310 in the desired direction and of sufficient magnitude to cause the robot to move to the target location. If the robot overshoots, undershoots, or otherwise misses the target, the controller repeats the process until the position of the robot 310 is close enough to the target position that no further movement is desired.

In one preferred embodiment, the fuel tank 352 is about 3 to 4 inches in diameter is positioned in the spherical body 318 and contains enough hydrogen peroxide fuel to sustain operations for over 8 hours of generally continuous operation. The use of a monopropellant simplifies the operation and design of the robot 310 because an oxidizer subsystem is not required. Nor is an ignition source necessary. Also, the use of a monopropellant allows the robot 310 to operate underwater and in space or other hostile environments. Moreover, the high power density of hydrogen peroxide (in particular) allows the robot 310 to move as rapidly as the fuel flow rate and gas generator will allow.

Figure 7:
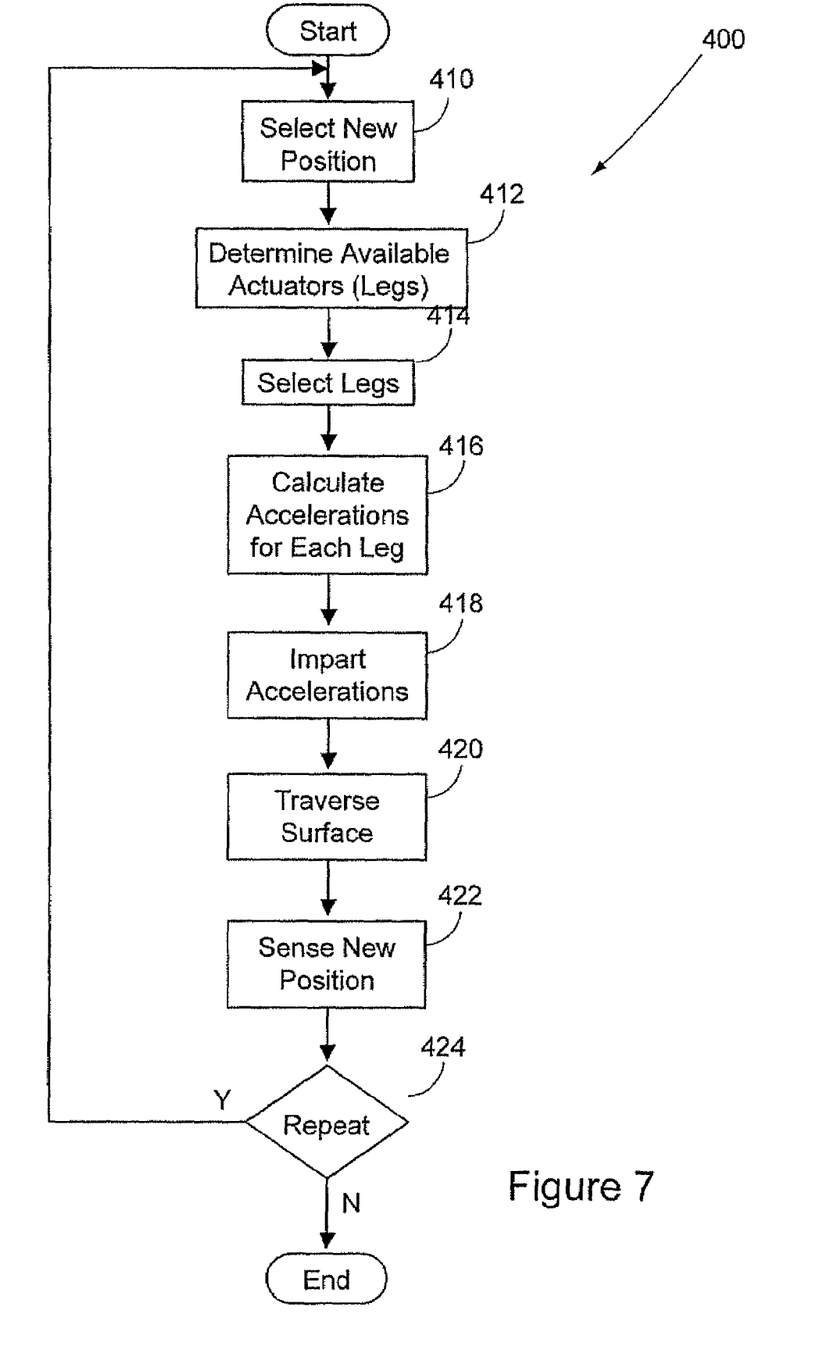
FIG. 7 illustrates a method in accordance with a preferred embodiment of the present invention.

As implied above, the present invention also provides methods for traversing a surface. One method 400 in accordance with a preferred embodiment of the present invention is illustrated in FIG. 7. The method 400 includes selecting a target position for a robot in operation 410. The legs (or actuators) of the robot which are contacting the surface are then determined. See operation 412. From these available actuators, a group of actuators is selected that are capable of moving the robot to the new position as in operation 414. Usually, the legs that are the farthest away from the target position are used. A determination is made regarding how much acceleration should be imparted to the robot from each of the selected legs. See operation 416. In operation 418, the actuators are used to impart the desired accelerations to the robot thereby creating a net acceleration on the robot. The imparted net acceleration causes the robot to traverse the surface as in operation 420 by hopping, stepping, or rotating depending on the selected mode of locomotion. The new position of the robot is then determined in operation 422 and if desired, the method repeats as indicated by operation 424. In particular, if the new position is not close enough to the target position (because, for example, an actuator failed) then alternative combinations of the legs can be employed to reposition the robot.

In view of the foregoing, it will be seen that the several advantages of the invention are achieved and attained. Vehicles constructed in accordance with the principals of the present invention are able to "hop" over obstacles that would immobilize conventional vehicles. Thus, the vehicles can maneuver over rough terrain and even climb stairs. Likewise, vehicles provided by the present invention can free themselves from traps by executing a series of random hops until an escape path is found. Further, hopping vehicles provided by the present invention can even be thrown through a window to reconnoiter a room or a building. The somewhat "jerky" motion caused by the hops of these vehicles makes them difficult to disable or capture. While, such vehicles can carry surveillance or communication equipment, they can also carry an explosive payload for destroying a target (or itself if it is captured or disabled).

Further, because the robots of the present invention rest on their legs, they need expend no energy while loitering. Additionally, because the mechanical subsystems are simple in comparison to other robot designs, and because the algorithms used to control the robot are relatively simple, the robots can readily be scaled up, or down, in size. Plus, because the robots constructed in accordance with the present invention have no "up" or "down" they cannot be toppled.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the vehicles provided by the present invention can be autonomous, semi-autonomous, or remotely controlled. In other preferred embodiments, the robot uses a compressed gas (e.g. CO2) instead of decomposed fuel to drive the legs of the robot. In still other preferred embodiments, the leg actuators are driven electrically rather than by a mechanical (fluid) energy source. Thus, the breadth and scope of the present invention should not be limited by any of the above-described exemplary embodiments, but should be defined only in accordance with the following claims appended hereto and their equivalents.

What is claimed is:

1. A method of traversing a surface, the method comprising:
   determining which legs a vehicle is resting on, the vehicle having at least three legs, each of the legs being configured and adapted to impart an acceleration to the vehicle in a direction along a longitudinal axis of the leg;
   determining in which direction to traverse the surface;
   imparting an acceleration to the vehicle generally in the direction in which to traverse the surface using at least one of the legs and in a manner so that the distal end of the at least one leg leaves the surface.

2. The method according to claim 1, the imparting acceleration further comprising causing the vehicle to hop over an obstacle.

3. The method according to claim 1, the imparting acceleration further comprising causing the vehicle to pivot around the distal end of at least one of the other legs.

4. The method according to claim 1, further comprising decomposing a monopropellant to power an actuator, the actuator being used to control motion of said at least one leg.

5. A method of traversing a surface, the method comprising:
   using a plurality of at least three legs to support a vehicle body, each of said legs being operable to impart acceleration to said vehicle body;
   determining a subset of said legs that are presently supporting said vehicle body above said surface;
   determining in which direction to move the vehicle body;
   determining which one or more legs of said subset of said legs are required for use to impart movement of said vehicle body in said direction;
   selectively controlling said subset of said legs to cause a thrusting action for each said leg of said subset of legs, that causes each said leg of said subset of legs to leave said surface, to thus collectively impart accelerations that propel said vehicle body in said direction.

6. The method of claim 5, further comprising using a monopropellant to power one or more legs of said subset of legs.

7. The method of claim 5, further comprising imparting a linear acceleration to at least one of said legs to cause said vehicle body to pivot about a different one of said legs in contact with said surface.

8. The method of claim 5, wherein using a plurality of three legs to support said vehicle body comprises using a plurality of at least three linear actuators.

9. The method of claim 5, further comprising using an inclinometer to determine which of said legs are resting on said surface, and therefore available to assist in propelling said vehicle body.

10. The method of claim 5, further comprising using a controller to calculate a series of accelerations required from each said leg in order to propel said vehicle body in said direction.

11. The method of claim 5, wherein said accelerations that propel said vehicle body in said direction comprises at least one hopping action.

12. The method of claim 5, wherein said propelling of said vehicle body in said direction comprises at least one stepping action.

13. The method of claim 5, wherein said accelerations that propel said vehicle body in said direction comprises at least one pivoting action wherein said vehicle body is pivoted about one of said legs that is in contact with said surface.

14. A method of traversing a surface, the method comprising:
   using a plurality of at least three controllably, linearly extendable legs to support a vehicle body, a distal end of each said leg being adapted to engage said surface to support said vehicle body above said surface, with a proximal end of each said leg being adapted to engage said vehicle body;
   determining a subset of said legs that are presently supporting said vehicle body above said surface;
   determining in which direction said vehicle body needs to be moved;
   determining which ones of said subset of said legs are required for use to impart movement of said vehicle body in said direction;
   selectively controlling said subset of said legs to cause a thrusting action for at least one of said legs, that causes said one leg to leave said surface, to thus collectively impart an acceleration that propels said vehicle body in said direction.

15. The method of claim 14, further comprising using a monopropellant to power each of said legs.

16. The method of claim 15, further comprising using decomposing of said monopropellant to power each of said legs.

17. The method of claim 14, wherein using a plurality of at least three controllably, linearly extendable legs comprises using a plurality of at least three actuators.

18. The method of claim 14, further comprising using a controller to calculate a series of accelerations required from specific ones of said legs to propel said vehicle body in said direction.

19. The method of claim 14, wherein collectively imparting accelerations that propel said vehicle body in said desired direction comprises at least one of:
- propelling said vehicle body in a series of hopping motions;
- propelling said vehicle body in a series of pivoting motions; and
- propelling said vehicle body in a series of stepping motions.

* * * * *